(12) United States Patent
Ootani

(10) Patent No.: US 12,576,509 B2
(45) Date of Patent: Mar. 17, 2026

(54) COUPLING STRUCTURE AND PARALLEL LINK ROBOT

(71) Applicant: FANUC CORPORATION, Yamanashi (JP)

(72) Inventor: Kentarou Ootani, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 18/853,186

(22) PCT Filed: Jul. 22, 2022

(86) PCT No.: PCT/JP2022/028515
§ 371 (c)(1),
(2) Date: Oct. 1, 2024

(87) PCT Pub. No.: WO2024/018629
PCT Pub. Date: Jan. 25, 2024

(65) Prior Publication Data
US 2025/0214228 A1 Jul. 3, 2025

(51) Int. Cl.
*B25J 9/00* (2006.01)
*B25J 19/00* (2006.01)

(52) U.S. Cl.
CPC ........... *B25J 9/0051* (2013.01); *B25J 19/007* (2013.01)

(58) Field of Classification Search
CPC ...... B25J 9/0051; B25J 9/0072; B25J 9/1065; B25J 17/0266; B25J 19/007
See application file for complete search history.

(56) References Cited

U.S. PATENT DOCUMENTS

| | | | | |
|---|---|---|---|---|
| 4,489,826 | A | * 12/1984 | Dubson | B25J 17/0266 |
| | | | | 901/14 |
| 8,973,459 | B2 * | 3/2015 | Fukudome | B25J 9/0051 |
| | | | | 901/27 |
| 10,369,692 | B2 * | 8/2019 | Nakanishi | B25J 9/1065 |
| 11,013,656 | B2 * | 5/2021 | Kim | A61H 1/0266 |
| 2012/0171383 | A1 * | 7/2012 | Christensen | B05B 13/0426 |
| | | | | 427/427.3 |
| 2014/0208883 | A1 * | 7/2014 | Lin | B25J 9/0051 |
| | | | | 901/27 |
| 2017/0271790 | A1 | 9/2017 | Chen et al. | |
| 2020/0240560 | A1 * | 7/2020 | Wicklow | F16B 7/06 |

FOREIGN PATENT DOCUMENTS

| | | |
|---|---|---|
| CN | 113059553 A | 7/2021 |
| DE | 102008062958 A1 | 7/2010 |
| JP | 63173513 U | 11/1988 |
| JP | H0676292 U * | 10/1994 |
| JP | 2000228839 A * | 8/2000 |
| JP | 2004358119 A * | 12/2004 |

(Continued)

*Primary Examiner* — Bobby Rushing, Jr.
(74) *Attorney, Agent, or Firm* — Maier & Maier, PLLC

(57) ABSTRACT

The coupling structure includes: a pair of attachment members that are supported on two links) that each have a longitudinal axis and move parallel to each other with a gap therebetween so as to be able to rotate about rotation axes that are perpendicular to a plane that includes the longitudinal axes of both the links; and a coupling mechanism that fixes the distance between the pair of attachment members in an adjustable manner.

5 Claims, 12 Drawing Sheets

(56) References Cited

FOREIGN PATENT DOCUMENTS

| | | | |
|---|---|---|---|
| JP | 2009097571 | A | 5/2009 |
| JP | 4653848 | B1 | 3/2011 |
| JP | 2011143528 | A | 7/2011 |
| JP | 2014046406 | A | 3/2014 |
| JP | 2014168839 | A | 9/2014 |
| JP | 2017052040 | A | 3/2017 |
| WO | 2014007159 | A1 | 1/2014 |

* cited by examiner

FIG. 12

COUPLING STRUCTURE AND PARALLEL LINK ROBOT

TECHNICAL FIELD

The present disclosure relates to a coupling structure and a parallel link robot.

BACKGROUND

There is a known coupling structure that couples two links (coupling links) of a parallel link robot with each other by interposing an elastic member therebetween, the two links being arranged parallel to each other (for example, see Japanese Unexamined Patent Application, Publication No. 2014-168839). This coupling structure utilizes the elastic force of the elastic member to pull the links in directions in which the two links are moved toward each other.

Each of the two links is supported on a drive link (base link) by means of a ball joint in a rotatable manner. As a result of pulling the links in directions in which the two links are moved toward each other by utilizing the elastic force of the elastic member, the occurrence of rattling is prevented in the ball joints even if the ball joints are worn due to aging.

SUMMARY

An aspect of the present disclosure is a coupling structure including: a pair of attachment members that are supported on two links that each have a longitudinal axis and move parallel to each other with a gap therebetween so as to be able to rotate about rotation axes that are perpendicular to a plane that includes the longitudinal axes of both of the links; and a coupling mechanism that fixes a distance between the pair of attachment members in an adjustable manner.

BRIEF DESCRIPTION OF DRAWINGS

FIG. 12 is a partial cross-sectional view showing a fourth modification of the one of the coupling structures shown in FIG. 2.

DETAILED DESCRIPTION OF EMBODIMENTS

A coupling structure 10 and a parallel link robot 100 according to an embodiment of the present disclosure will be described below with reference to the drawings.

Figure 1:
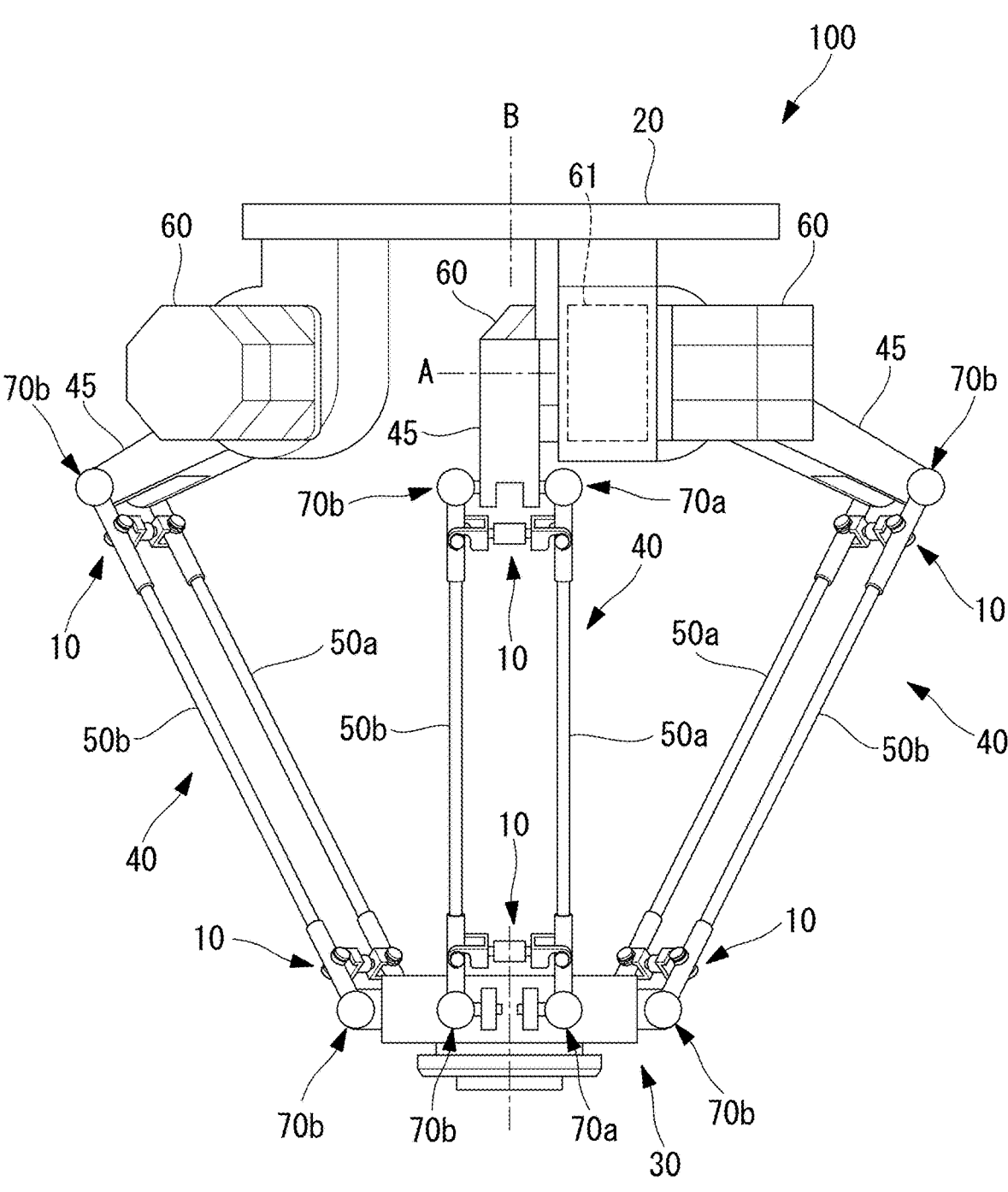
FIG. 1 is a front view schematically showing a parallel link robot according to an embodiment of the present disclosure.

The parallel link robot 100 according to this embodiment includes, for example, as shown in FIG. 1, a foundation 20 that is fixed to and suspended from the ceiling or the like and a movable portion 30 that is disposed below the foundation 20 with a gap therebetween. In addition, the parallel link robot 100 includes three arms 40 that couple the foundation 20 and the movable portion 30.

The arms 40 includes three drive links (arms) 45 that are supported on the foundation 20 so as to be respectively rotatable about three horizontal axes A. In addition, each of the arms 40 includes two passive links (links) 50a and 50b that connect, as a pair, the drive link 45 and the movable portion 30 and that are parallel to each other.

Furthermore, the parallel link robot 100 includes coupling structures 10 according to this embodiment of the present disclosure, the coupling structures 10 bridging between each pair of passive links 50a and 50b at the top end and the bottom end thereof.

The foundation 20 includes three servomotors 60 for respectively driving the three drive links 45. The servomotors 60 are disposed with equal intervals in a circumferential direction about an axis B that passes through the center of the foundation 20 in a vertical direction, and have rotational drive shafts (not shown) that are respectively rotated about the horizontal axes A. In addition, the respective servomotors 60 include decelerators 61 that decelerate the rotation of the rotational drive shafts.

Each of the drive links 45 is connected to, at the basal end thereof, the rotational drive shaft of the corresponding servomotor 60 and is rotatable about the axis A with respect to the foundation 20. In addition, as shown in FIGS. 1 and 2, the passive links 50a and 50b are respectively connected to a distal end of each of the drive links 45 by means of ball joints 70a and 70b.

The ball joints 70a and 70b respectively include ball studs 71a and 71b that are attached to the distal end of each of the drive links 45 and sockets 51a and 51b that are connected to the ball studs 71a and 71b.

The ball studs 71a and 71b respectively include balls 72a and 72b and columnar studs 73a and 73b that extend radially outward from outer spherical surfaces of the balls 72a and 72b. End surfaces of the studs 73a and 73b are respectively fixed to the drive link 45 by means of bolts 74 on both sides in the axis A (see FIG. 1) direction across the distal end of the drive link 45.

Figure 2:
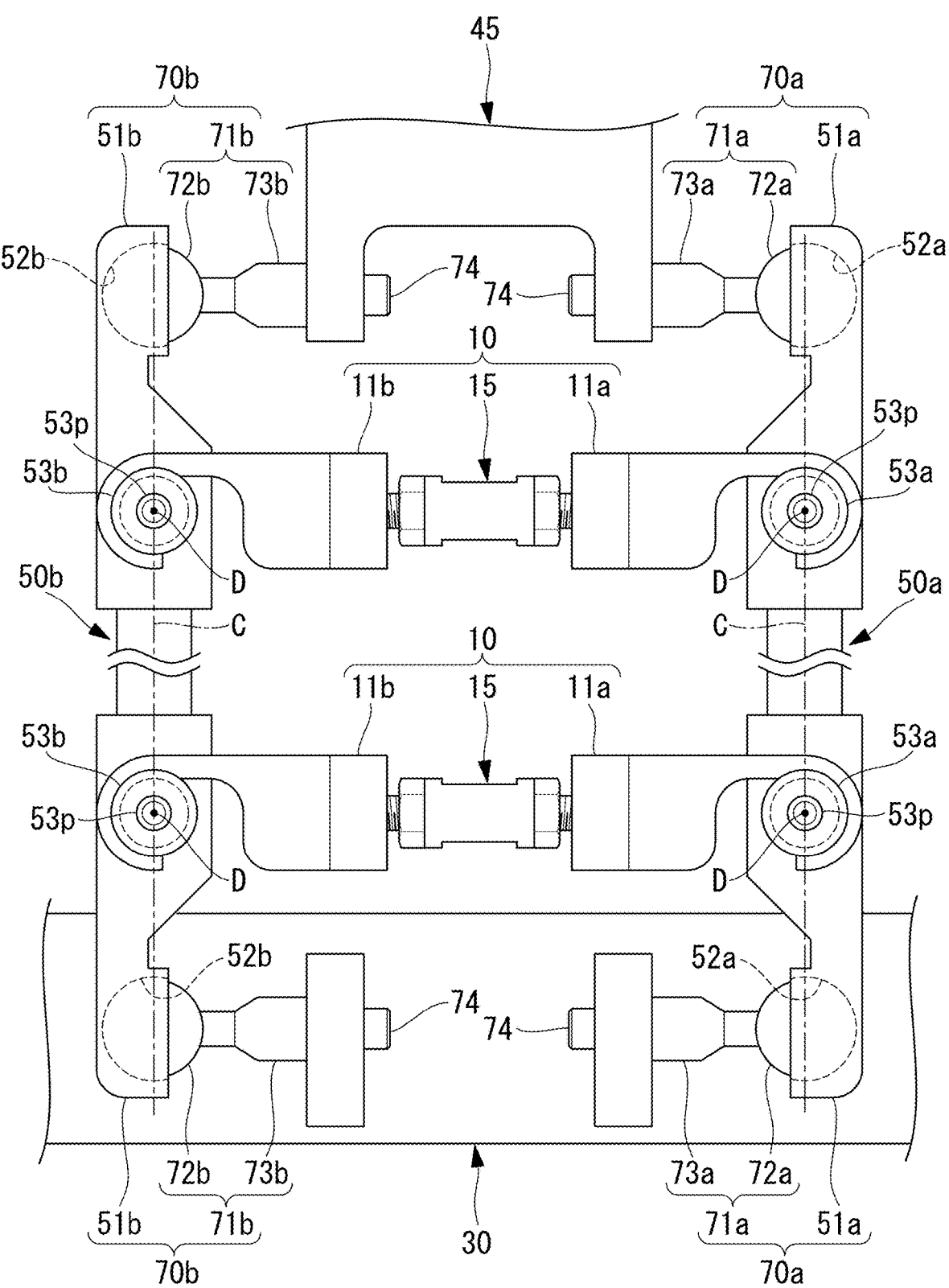
FIG. 2 is a front view schematically showing an attached state of coupling structures in a pair of passive links of the parallel link robot shown in FIG. 1.

As shown in FIG. 2, the sockets 51a and 51b respectively constitute one-side end portions of the passive links 50a and 50b in longitudinal axis C directions. The sockets 51a and 51b respectively include inner spherical surfaces 52a and 52b that cover about half the areas of the outer spherical surfaces of the balls 72a and 72b. In addition, in the inner spherical surfaces 52a and 52b, thin resin layers (not shown) formed from a resin material, such as silicon, are disposed, and the balls 72*a* and 72*b* are fitted inside thereof and respectively supported so as to be rotatable about centers thereof.

Next, the coupling structure 10 according to this embodiment will be described.

The coupling structure 10 according to this embodiment includes a pair of attachment members 11*a* and 11*b* that are respectively attached to pins 53*p* provided in the sockets 51*a* and 51*b* and a coupling mechanism 15 that couples the attachment members 11*a* and 11*b* with each other.

In this embodiment, the three pairs of the passive links 50*a* and 50*b* and the coupling structures 10 that couple the respective pairs of the passive links 50*a* and 50*b* at the top and bottom ends thereof all have the same configurations. Therefore, in the following, the configuration of a coupling structure 10 that couples, in the pair of passive links 50*a* and 50*b,* one end of a passive link with one end of the other passive link will be described as an example.

Figure 3:
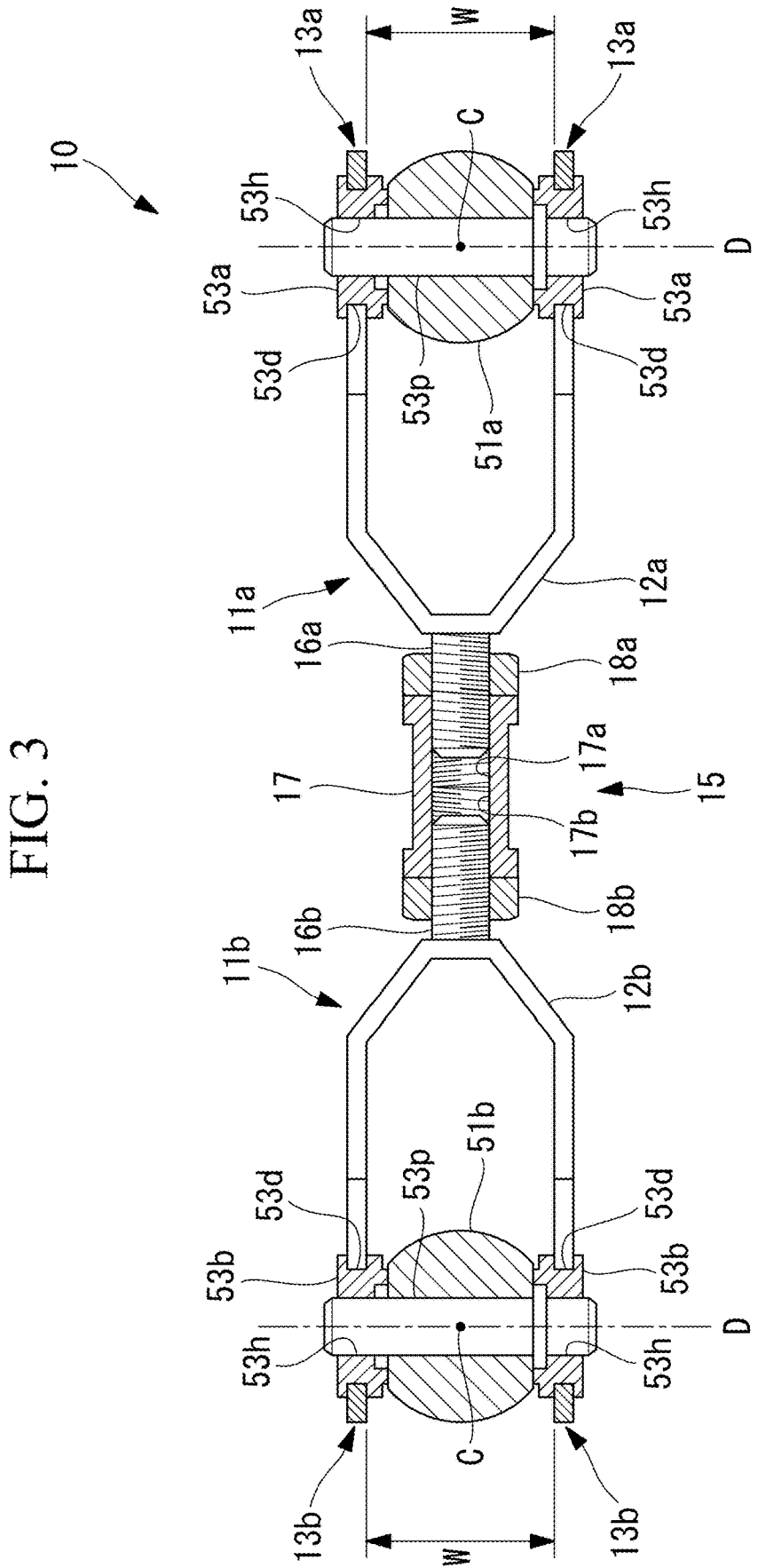
FIG. 3 is a partial cross-sectional view schematically showing one of the coupling structures shown in FIG. 2.

As shown in FIG. 3, each of the pins 53*p* is attached to the socket 51*a* or 51*b* so as to protrude along an axis (rotation axis) D, which is orthogonal to a plane including the two longitudinal axes C, on either side of the plane. In the figure, the pin 53*p* includes a brim-like flange, is fitted, from one direction, to a hole that extends through the socket 51*a* or 51*b* in a radial direction, and is positioned so that the flange is abutted against an outer surface of the socket 51*a* or 51*b.*

In addition, bushes 53*a* and 53*b* are respectively attached to the portions of the pins 53*p* that protrude from the sockets 51*a* and 51*b.*

Each of the bushes 53*a* and 53*b* has a cylindrical form in which a hollow hole 53*h* is formed. In addition, a groove 53*d* that is depressed radially inward is formed, at a center in the axial direction, on an outer circumferential surface of each of the bushes 53*a* and 53*b* over the entire circumference thereof.

As a result of fitting the pins 53*p* into the hollow holes 53*h,* the bushes 53*a* and 53*b* are respectively supported by the pins 53*p* so as to be rotatable about the axes D.

In the figure, the bushes 53*a* and 53*b* having the same shape are used. Each of the bushes 53*a* and 53*b* includes a notch for avoiding interference with the flange of the pin 53*p,* the flange is accommodated in the notch of the bushes 53*a,* 53*b,* and the notch of the other the bushes 53*a,* 53*b* is hollow.

Note that, in the case in which the pins 53*p* are integrally fixed to the sockets 51*a* and 51*b* by means of welding or the like, the flanges of the pins 53*p* and the notches of the bushes 53*a* and 53*b* may be omitted.

In addition, as shown in FIG. 2, the other end of each of the passive links 50*a* and 50*b* in the longitudinal axis C direction also has the same configuration as the one end thereof. Specifically, each of the sockets 51*a* and 51*b* is also attached to the other end of each of the passive links 50*a* and 50*b.* Also, the sockets 51*a* and 51*b* are connected so as to sandwich the ball studs 71*a* and 71*b,* which are attached to an outer circumferential surface of the movable portion 30, from outside the two ball studs in the axis A direction.

Figure 4:
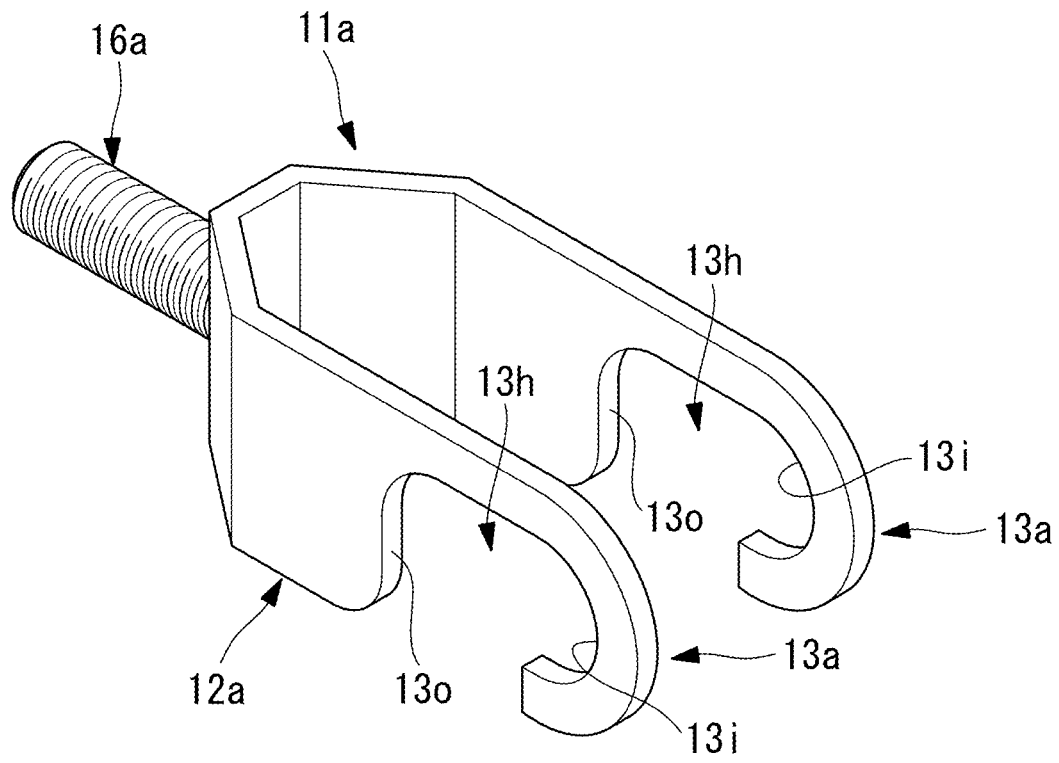
FIG. 4 is a perspective view showing the shape of one of attachment members in the one of the coupling structures shown in FIG. 2.

As shown in FIGS. 3 and 4, the attachment member 11*a* includes a hook portion 12*a* and a male screw 16*a* fixed to the hook portion 12*a.* The hook portion 12*a* is constituted by bending, into a substantially U-shape, an elongated strip-shaped metal flat plate having a plate thickness equivalent to the groove width of the groove 53*d* of the bush 53*a.* Two metal flat plates of the substantially U-shaped hook portion 12*a,* which extend substantially parallel to each other, are disposed with a gap therebetween, the size of the gap being the same size as a distance W between the grooves 53*d* of the pair of bushes 53*a* attached on either side of the socket 51*a* in the axis D direction.

In addition, the two metal flat plates of the hook portion 12*a,* which extend substantially parallel to each other, are provided with two hooks 13*a* that are respectively hooked on the grooves 53*d* of the pair of bushes 53*a* attached to the socket 51*a.*

The two hooks 13*a* are constituted by respectively cutting out the two substantially parallel metal flat plates of the hook portion 12*a* in the plate thickness direction.

In particular, the two hooks 13*a* respectively include long holes 13*h* extending in a length direction of the hook portion 12*a.* On one end of each of the long holes 13*h* in the longitudinal direction thereof, an inner circumferential surface 13*i* having the same inner diameter dimension as the outer diameter dimension of a groove bottom of the groove 53*d* of the bush 53*a* is formed. In addition, on the other end of the long hole 13*h* in the longitudinal direction thereof, an opening 13*o* that provides an opening in the long hole 13*h* on one side thereof in the width direction of the hook portion 12*a* is provided. The opening 13*o* is formed so as to be larger than the outer diameter dimension of the groove 53*d* of the bush 53*a* at the groove bottom.

The male screw 16*a* is formed in a right-handed thread and extends toward the opposite direction from the hooks 13*a* in parallel to the hooks 13*a* at a position between the hooks 13*a* on the two sides in the hook portion 12*a.*

On the other hand, the attachment member 11*b* includes a hook portion 12*b* having the same shape as the hook portion 12*a* of the attachment member 11*a.* In addition, a male screw 16*b* is fixed at a position between hooks 13*b* provided on the two sides of the hook portion 12*b,* the male screw 16*b* having the same outer diameter (nominal diameter) and pitch as the male screw 16*a* and being different therefrom only in terms of the spinning direction of the threaded portion thereof. In other words, the male screws 16*a* and 16*b* are in the reverse thread relationship with respect to each other.

Figure 5:
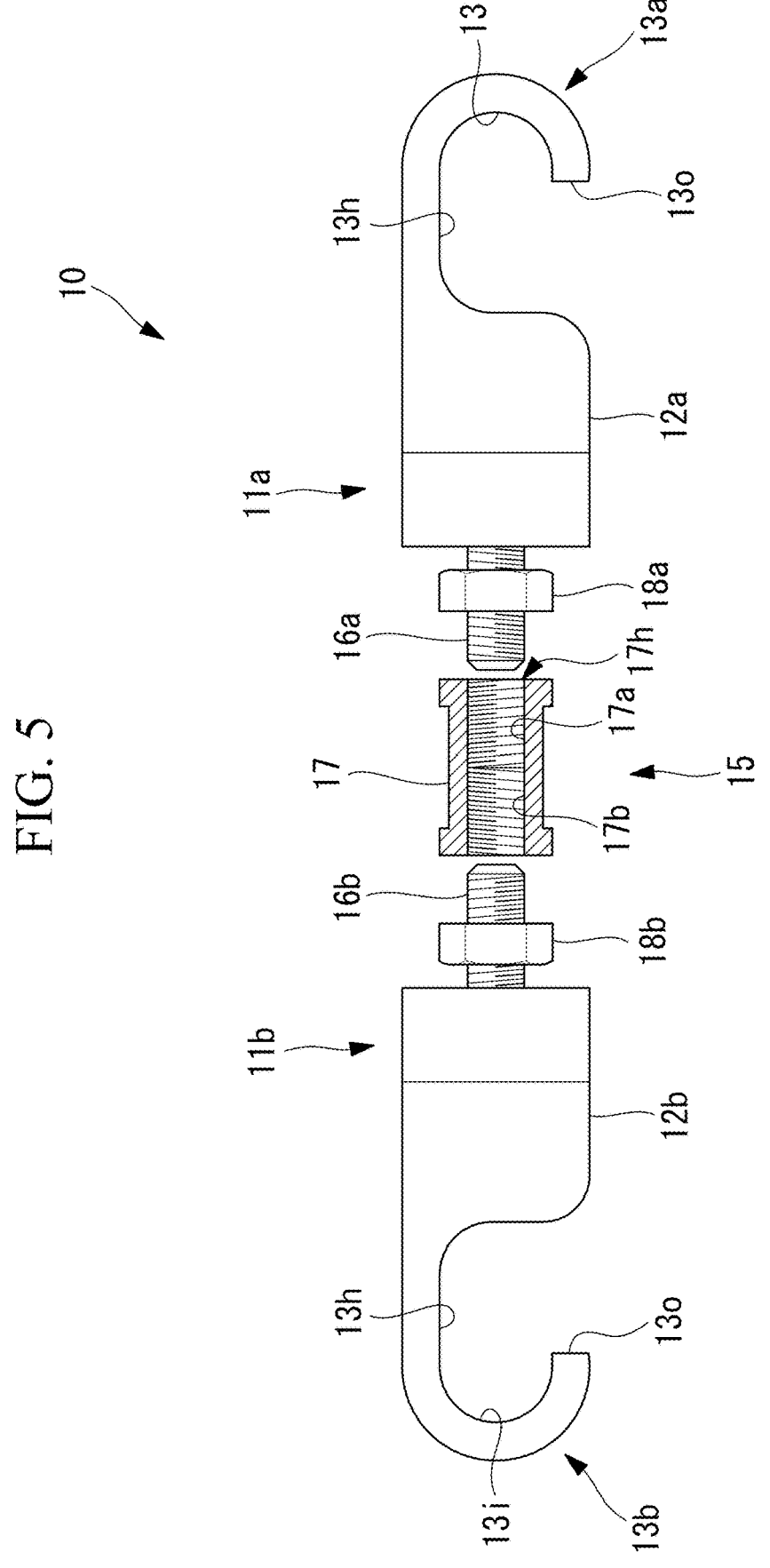
FIG. 5 is a partial cross-sectional view showing a disassembled state of the one of the coupling structures shown in FIG. 2.

As shown in FIGS. 3 and 5, the coupling mechanism 15 includes the male screws 16*a* and 16*b* included in the attachment members 11*a* and 11*b* and a nut member 17 that is fastened to the male screws 16*a* and 16*b.*

The nut member 17 is a cylindrical member having a through-hole 17*h* along a center axis thereof. On an inner surface of the through-hole 17*h* of the nut member 17, a female screw 17*a* that engages with the male screw 16*a* and a female screw 17*b* that engages with the male screw 16*b* are formed next to each other in the center axis direction.

The female screw 17*a* having a right-handed thread is formed on one end side from the center of the nut member 17 in the center axis direction and the female screw 17*b* having a left-handed thread is formed on the other end side from the center of the nut member 17 in the center axis direction. In other words, the female screws 17*a* and 17*b* are respectively disposed next to each other on the same axis and serve as reverse threads that are open in opposite directions from each other.

In addition, a pair of flat portions that are parallel to each other and that serve as portions with which a tool, such as a wrench, engages are provided on an outer circumferential surface of the nut member 17 on both sides of the center axis thereof.

In addition, fixing nuts 18*a* and 18*b* respectively engage with the male screws 16*a* and 16*b.* The fixing nuts 18*a* and 18*b* may have equivalent shapes except for that the two nuts are in the reverse thread relationship with respect to each other and may be commercially available general nuts.

The operation of the thus-configured coupling structures 10 and parallel link robot 100 will be described below. However, in the following also, a coupling structure 10 that bridges, in the pair of links 50a and 50b, one end of a link and one end of the other link will be described as an example, as was done above.

When assembling the parallel link robot 100, it is assumed that a unit including the foundation 20, the three servomotors 60, the three decelerators 61, and the three drive links 45 is assembled in advance. First, as shown in FIGS. 1 and 2, a pair of ball studs 71a, 71b are respectively fixed to the distal end of a drive link 45 and the outer circumferential surface of the movable portion 30 by means of the bolts 74.

Next, as shown in FIG. 2, the sockets 51a and 51b at one end of the pair of passive links 50a and 50b are brought close to the ball studs 71a and 71b at the distal end of the drive link 45 from outside in the axis A direction. Then, the inner spherical surfaces 52a and 52b of the sockets 51a and 51b are respectively fitted to the balls 72a and 72b of the ball studs 71a and 71b.

Similarly, the inner spherical surfaces 52a and 52b of the sockets 51a and 51b at the other end of the pair of passive links 50a and 50b are fitted to the balls 72a and 72b of the ball studs 71a and 71b attached to the movable portion 30.

Next, as shown in FIG. 5, the fixing nuts 18a and 18b are respectively engaged with the male screws 16a and 16b fixed to the attachment members 11a and 11b.

Figure 6:
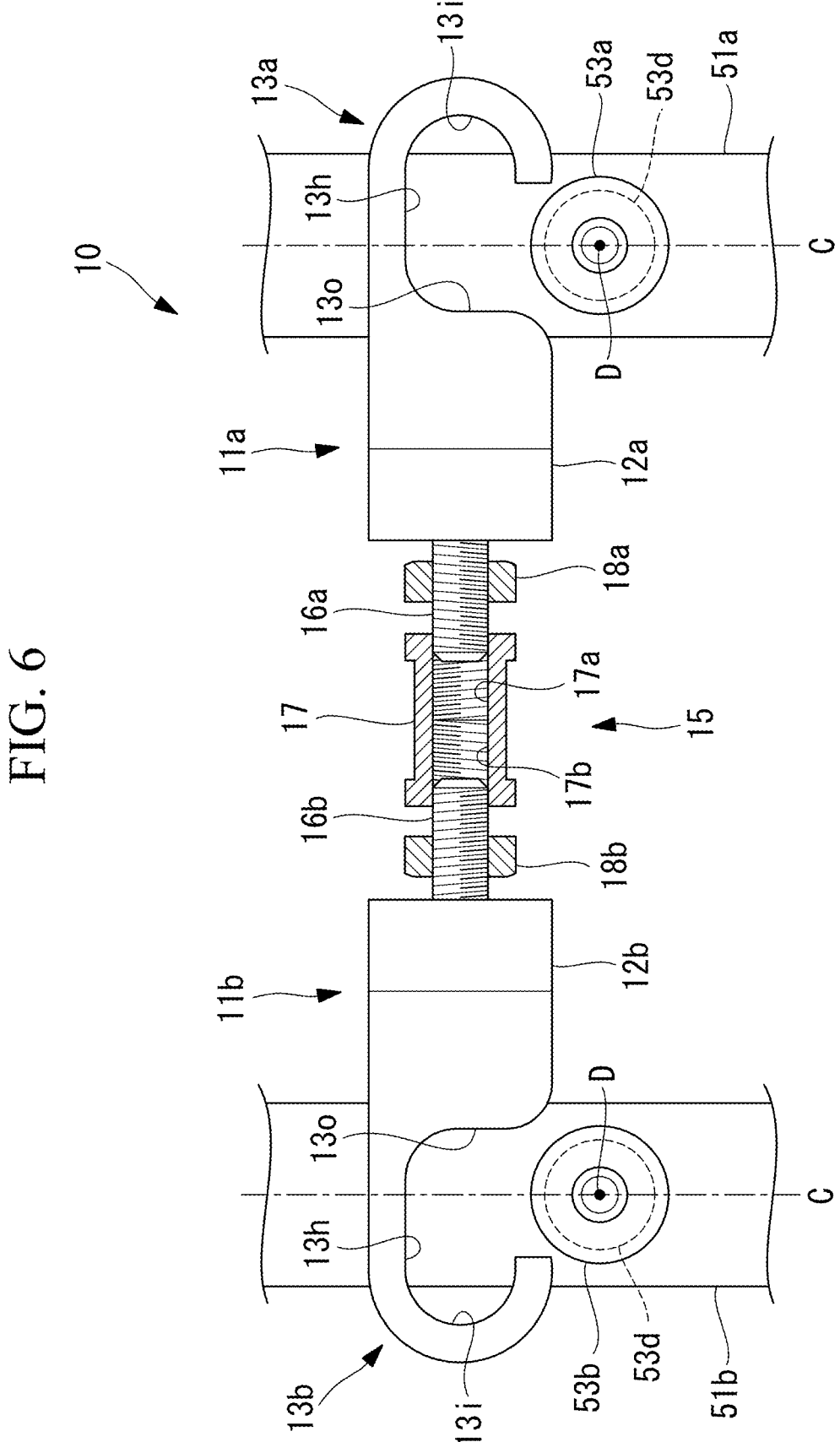
FIG. 6 is a partial cross-sectional view for explaining an attaching method of the one of the coupling structures shown in FIG. 2.

Next, as shown in FIG. 6, the male screws 16a and 16b are respectively engaged with the female screws 17a and 17b of the nut member 17, and thus, the two attachment members 11a and 11b are coupled with each other by means of the nut member 17. In this case, the lengths by which the male screws 16a and 16b and the female screws 17a and 17b are engaged with each other are adjusted so that a gap between the openings 130 of the attachment members 11a and 11b becomes about the same as a gap between the two axes D.

Figure 7:
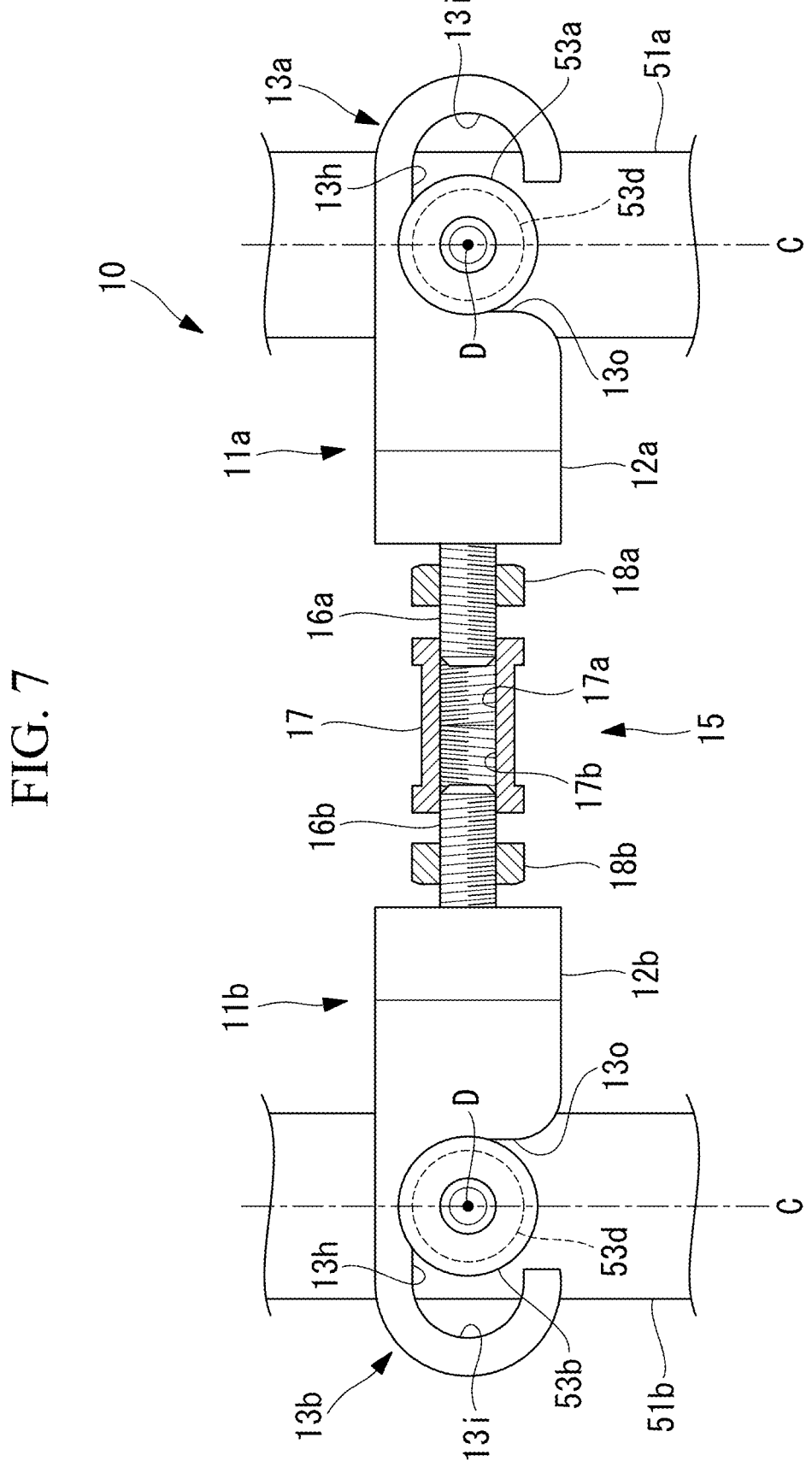
FIG. 7 is a partial cross-sectional view for explaining the attaching method of the one of the coupling structures shown in FIG. 2.

In this state, as shown in FIG. 6, the attachment members 11a and 11b coupled by means of the nut member 17 are disposed at a position at which the hooks 13a, 13b of each pair respectively sandwich the sockets 51a, 51b in the axis D direction. Then, as shown in FIG. 7, the bushes 53a and 53b are made to pass through the respective openings 13o of the attachment members 11a and 11b and the bushes 53a and 53b are respectively disposed in the long holes 13h.

Next, the flat portions on the outer circumferential surface of the nut member 17 are gripped by means of a tool or the like and the nut member 17 is rotated about the center axis thereof in one direction. Accordingly, the length by which the male screw 16a and the female screw 17a are engaged with each other and the length by which the male screw 16b and the female screw 17b are engaged with each other simultaneously increase.

Figure 8:
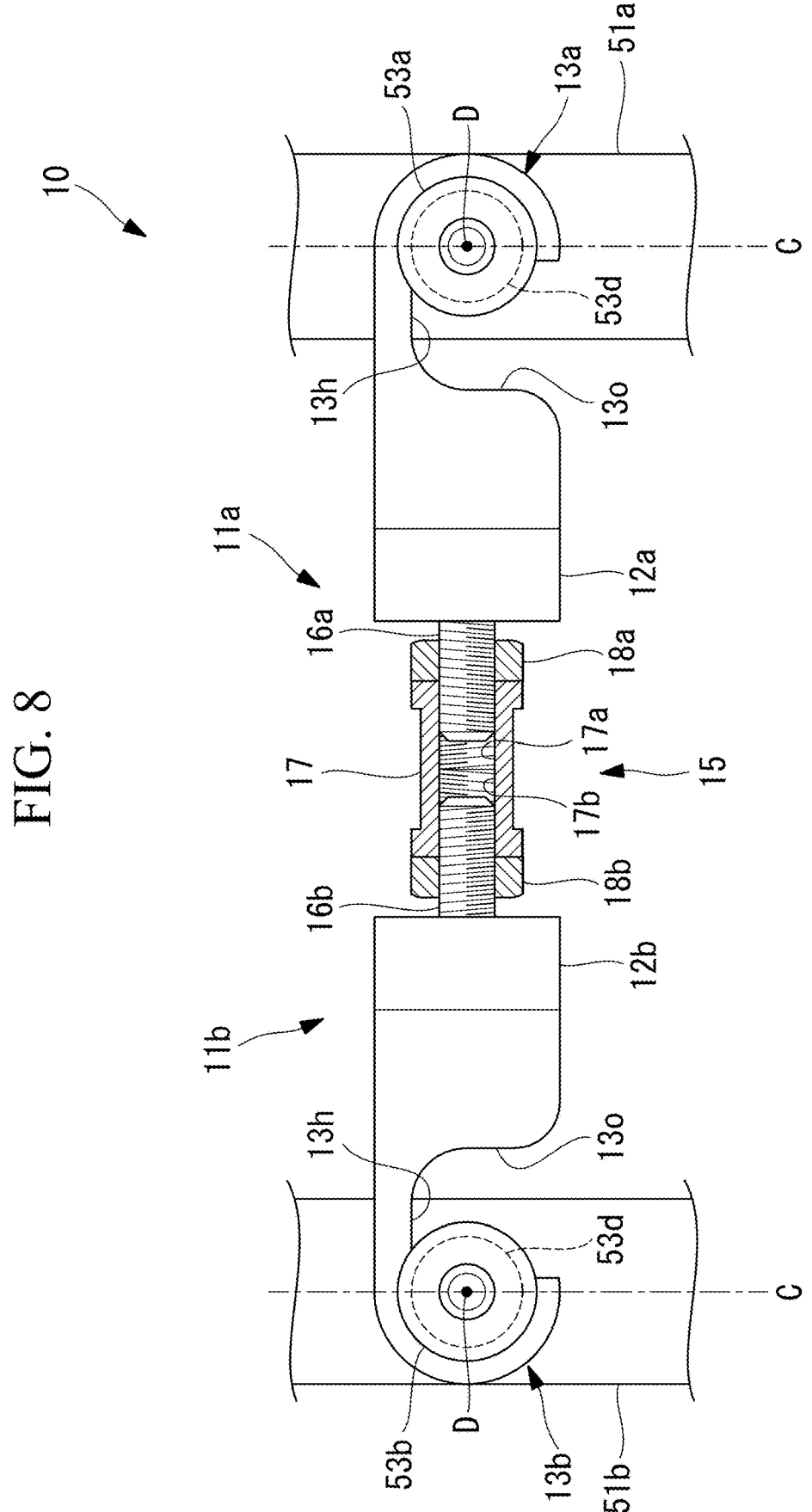
FIG. 8 is a partial cross-sectional view showing the attached state of the one of the coupling structures shown in FIG. 2.

As a result, the distance between the attachment members 11a and 11b decreases, and, as shown in FIG. 8, the inner circumferential surfaces 13i of the attachment members 11a and 11b respectively come into firm contact with the grooves 53d of the bushes 53a and 53b. Accordingly, the pressure can be applied to the ball joints 70a and 70b between the passive links 50a and 50b and the drive link 45 by pulling the pair of passive links 50a and 50b toward each other.

Also, for example, by measuring the torque applied to the tool when the nut member 17 is rotated, the rotation of the nut member 17 is stopped at the point in time when it is confirmed that an appropriate amount of pressure is applied to the ball joints 70a and 70b.

After the rotation of the nut member 17 is stopped, as shown in FIG. 8, the fixing nuts 18a and 18b are respectively fastened so as to be in firm contact with the nut member 17. In other words, due to the double nut effect of the fixing nuts 18a and 18b, the position of the nut member 17 with respect to the male screws 16a and 16b is fixed. Accordingly, the assembly work is completed.

As has been described above, with the coupling structure 10 according to this embodiment, the two passive links 50a and 50b can be coupled in a state in which the distance between the two links is adjusted to an appropriate distance. Accordingly, even if a large external force acts during the operation of the parallel link robot 100, it is possible to prevent the gap between the passive links 50a and 50b from increasing. Also, it is possible to avoid a situation in which the ball joints 70a and 70b between the passive links 50a and 50b and the drive link 45 are subjected to a pressure exceeding the necessary amount.

Therefore, the wearing of the resin layers between the sockets 51a and 51b and balls 72a and 72b is suppressed, and it is possible to enhance the lifetime of the ball joints 70a and 70b.

In addition, there are cases in which the rein layers of the ball joints 70a and 70b are worn and the thickness thereof decreases due to aging.

In this case, the fixing nuts 18a and 18b are loosened, the nut member 17 is rotated about the center axis, and the lengths by which the male screws 16a and 16b and the female screws 17a and 17b engage with each other increase. Accordingly, it is possible to bring the attachment members 11a and 11b close to each other in an amount corresponding to the decrease in the resin layers due to the wearing thereof.

Therefore, even if the distance between the two passive links 50a and 50b changes, it is possible to readjust the distance by which the two passive links 50a and 50b are coupled with each other in accordance with the change, and thus, it is possible to prevent the occurrence of rattling in the ball joints 70a and 70b.

In other words, it is possible to prevent the occurrence of rattling in the ball joints 70a and 70b without having to interpose a coil spring between the pair of passive links 50a and 50b, as has conventionally been done. In addition, because a coil spring is not employed, it is possible to enhance the work efficiency when the parallel link robot 100 is washed or dried after being washed.

In addition, in this embodiment, the length by which the male screw 16a and the female screw 17a engage with each other and the length by which the male screw 16b and the female screw 17b engage with each other can be simultaneously adjusted simply by rotating the nut member 17 about the center axis in one direction. In other words, there is an advantage in that it is possible to easily adjust the distance between the passive links 50a and 50b by a single manipulation of the nut member 17.

Figure 9:
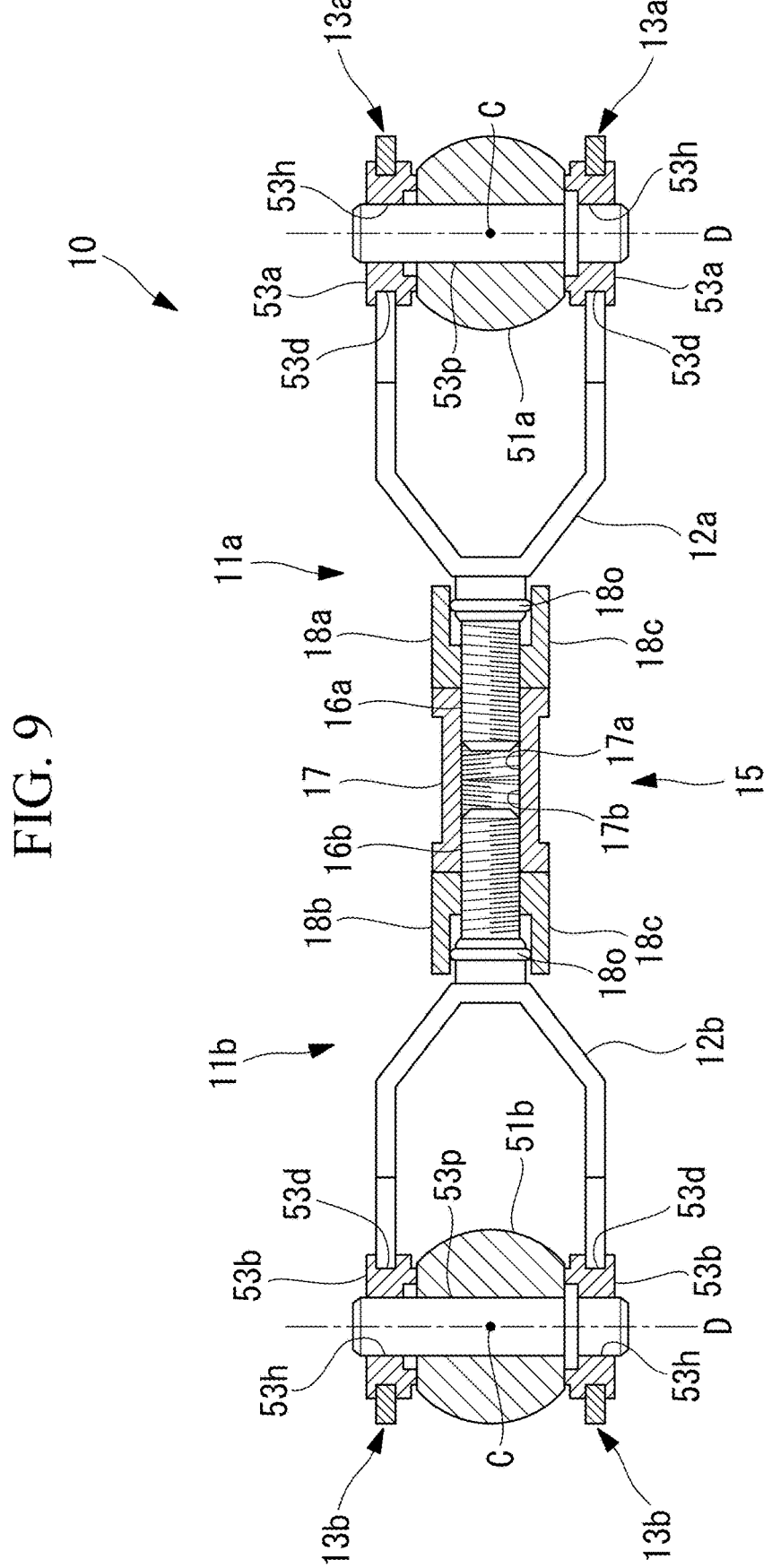
FIG. 9 is a partial cross-sectional view showing a first modification of the one of the coupling structures shown in FIG. 2.

Note that, in this embodiment, nuts having a general shape, as shown in FIG. 2, are employed as the fixing nuts 18a and 18b. Alternatively, as shown in FIG. 9, each of the fixing nuts 18a and 18b may include an outer circumferential wall 18c that protrudes in the axial direction over the entire circumference of an outer peripheral edge portion.

In this case, in the state in which the fixing nuts 18a and 18b are respectively in firm contact with the two ends of the nut member 17, portions of the male screws 16a and 16b disposed farther outside the nut member 17 in the axial direction are surrounded by the respective outer circumferential walls 18c. Accordingly, the male screws 16a and 16b are not exposed to the exterior, and thus, it is possible to prevent external dust and moisture from becoming attached to the male screws 16a and 16b.

Also, in addition to such a feature, grooves (not shown) may be provided over the entire circumferences of outer circumferential surfaces of base portions of the male screws 16a and 16b in intermediate positions in the axial direction thereof, and O-rings 18o may be fitted to the grooves.

In this case, the outer diameters of the O-rings 18o are set to be slightly larger than the inner diameters of the outer circumferential walls 18c. Accordingly, the O-rings 18o are brought into firm contact with inner circumferential surfaces of the outer circumferential walls 18c that cover the base portions of the male screws 16a and 16b while the O-rings 18o are slightly squashed over the entire circumferences thereof. Consequently, the gaps between the outer circumferential surfaces of the base portions of the male screws 16a and 16b and the inner circumferential surfaces of the outer circumferential walls 18c that cover the portions are sealed. Accordingly, there is an advantage in that it is possible to more reliably protect the male screws 16a and 16b from external dust and moisture.

In addition, in this embodiment, each of the attachment members 11a and 11b are respectively attached to the sockets 51a and 51b by means of the pair of bushes 53a and 53b. Alternatively, as shown in FIG. 10, the attachment members 11a and 11b may be attached to the sockets 51a and 51b by means of bearings 11c fixed to the attachment members 11a and 11b.

Figure 10:
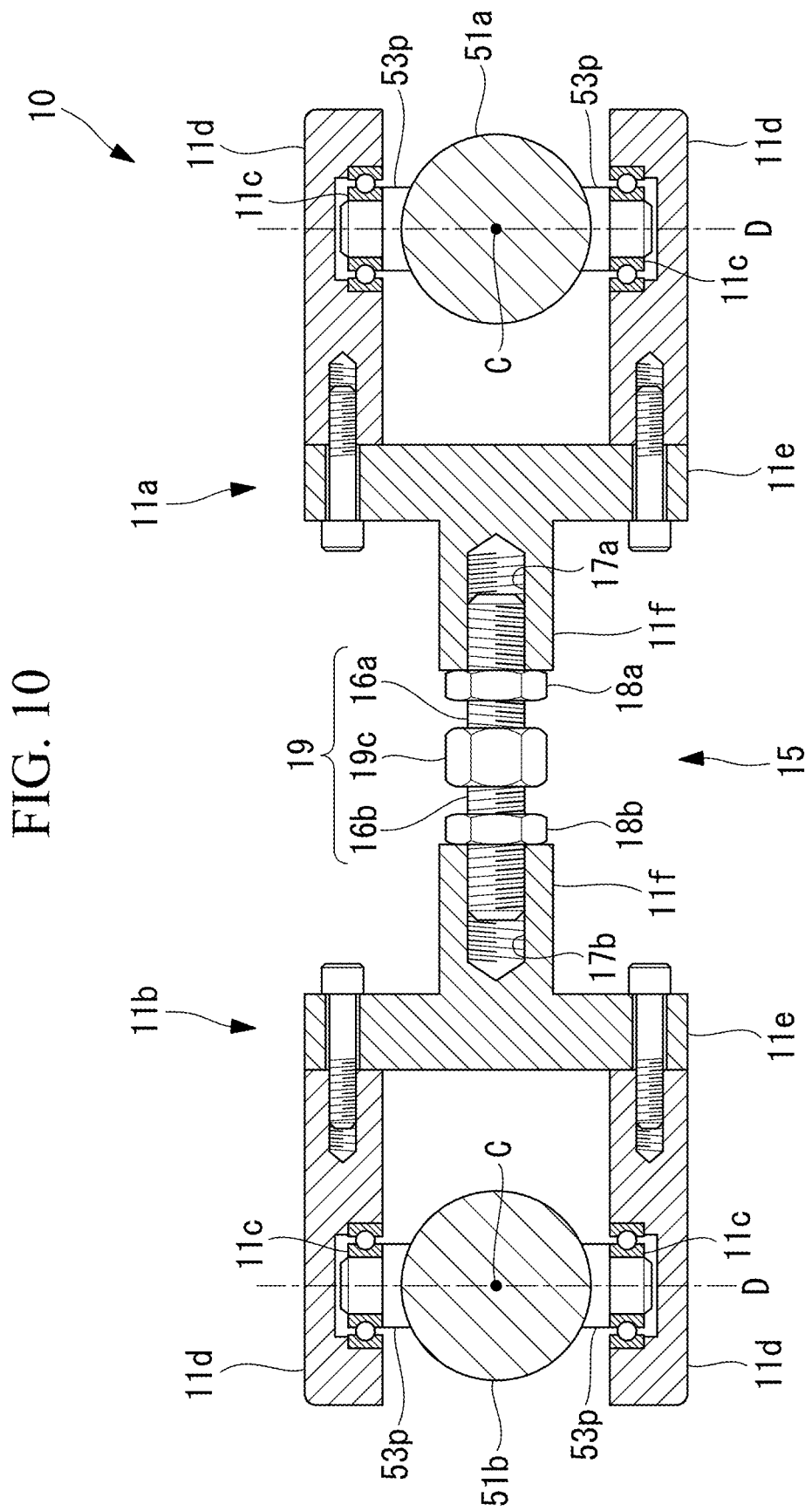
FIG. 10 is a partial cross-sectional view showing a second modification of the one of the coupling structures shown in FIG. 2.

In the case of the example shown in FIG. 10, the attachment members 11a and 11b each include a pair of parallel plate-like first portions 11d respectively having a large enough thickness to allow the bearings 11c to be fitted thereto. In addition, each of the attachment members 11a and 11b includes a second portion 11e that couples, in the pair of first portions 11d, one end of one of the first portions 11d and one end of the other first portion 11d with each other. Also, the pins 53p that respectively protrude from outer surfaces of the sockets 51a and 51b on the two sides thereof in the axis D direction, are fitted to the bearings 11c, each of which is fitted to the other end of each of the first portions 11d of the attachment members 11a and 11b.

With such a configuration also, it is possible to attach the attachment members 11a and 11b, which couple the passive links 50a and 50b with each other, to the sockets 51a and 51b so as to be rotatable about the axes D.

In addition, in this embodiment, the coupling mechanism 15 includes the male screws 16a and 16b fixed to the attachment members 11a and 11b and the nut member 17 in which the female screws 17a and 17b corresponding to the male screws 16a and 16b are formed.

Alternatively, the female screws 17a and 17b may respectively be formed in the attachment members 11a and 11b.

For example, as shown in FIG. 10, the second portions 11e of the attachment members 11a and 11b connected to the sockets 51a and 51b so as to be rotatable about the axes D may each include a shaft portion 11f that respectively protrudes toward the other side. A right-handed thread female screw 17a may be formed in the shaft portion 11f of the attachment member 11a, and a left-handed thread female screw 17b may be formed in the shaft portion 11f of the attachment member 11b.

In addition, as the coupling mechanism 15 in this case, a screw member 19 having a right-handed thread male screw 16a and a left-handed thread male screw 16b that are respectively disposed next to each other on the same axis may be employed, instead of the nut member 17. The screw member 19 may include, for example, a hexagonal columnar body portion 19c and the male screws 16a and 16b may respectively extend along a center axis of the body portion 19c outward from two ends thereof.

Accordingly, by respectively engaging the male screws 16a and 16b of the screw member 19 with the female screws 17a and 17b of the attachment members 11a and 11b, it is possible to couple the attachment members 11a and 11b so that the distance between the two members can be adjusted.

In addition, in this embodiment, one attachment member 11a or 11b is attached so as to sandwich the socket 51a or 51b in the axis D direction. Alternatively, two attachment members 11a or 11b may be attached so as to sandwich the socket 51a or 51b in the axis D direction.

Figure 11:
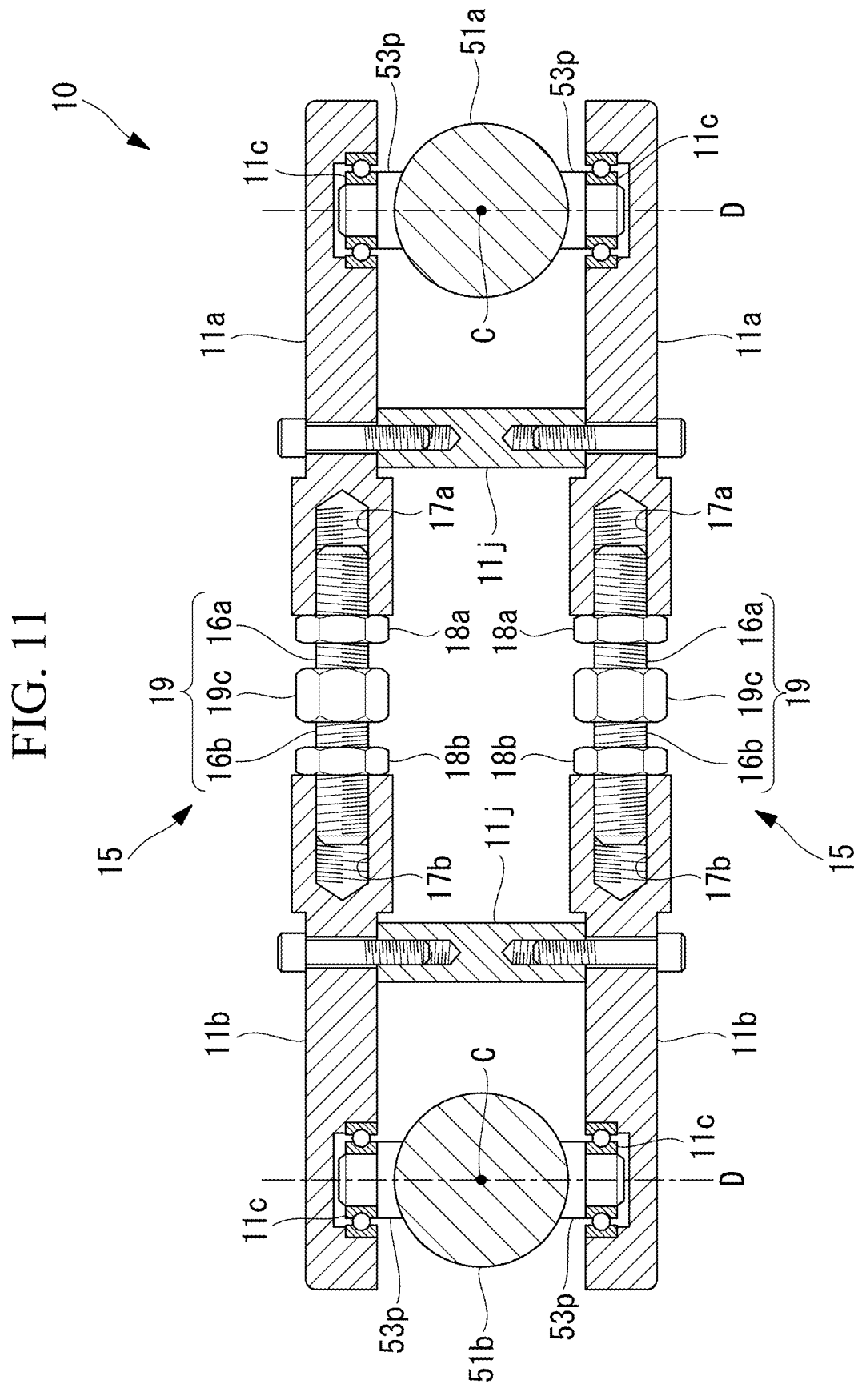
FIG. 11 is a partial cross-sectional view showing a third modification of the one of the coupling structures shown in FIG. 2.

For example, as shown in FIG. 11, a flat plate-like attachment member 11a or 11b may be attached to the socket 51a or 51b one each on the two sides thereof in the axis D direction so as to be rotatable about the axis D. In addition, a right-handed thread female screw 17a is formed at a distal end of the attachment member 11a and a left-handed thread female screw 17b is formed at a distal end of the attachment member 11b. Thus, each pair of attachment members 11a and 11b are coupled with each other by means of the screw member 19 that is the same as that in the embodiment shown in FIG. 10.

In addition, in this embodiment, the attachment members 11a that sandwich the socket 51a in the axis D direction may be integrally joined with each other by means of a joint member 11j and the attachment members 11b that sandwich the socket 51b in the axis D direction may also be integrally joined with each other by means of a joint member 11j.

In addition, in this case, the attachment members 11a and 11b are coupled with each other by interposing the nut member 17 therebetween; however, alternatively, the nut member 17 may be omitted and the attachment members 11a and 11b may be directly connected with each other.

Figure 12:
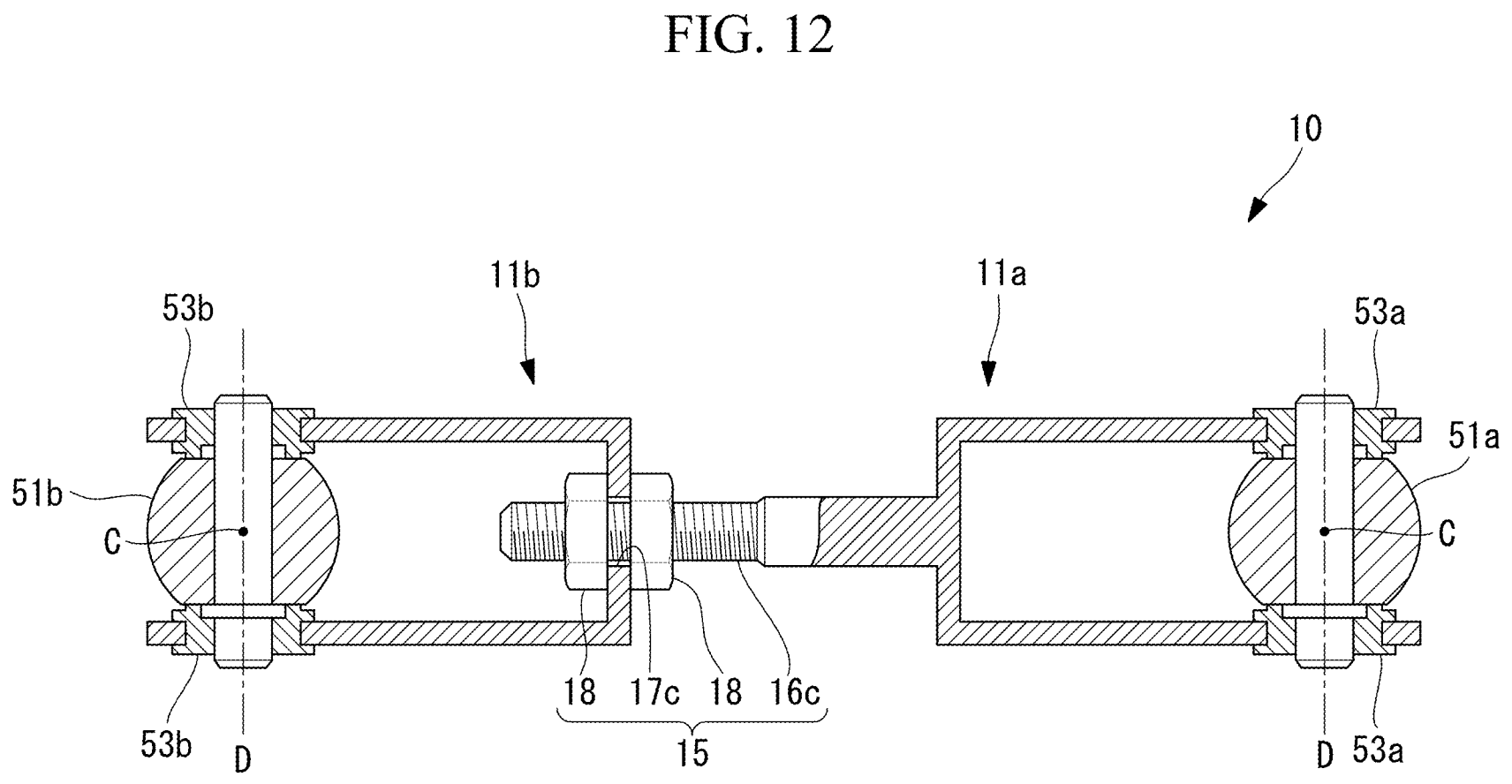

For example, as shown in FIG. 12, the attachment member 11a may include a male screw 16c that extends toward the attachment member 11b, and the attachment member 11b may include a through-hole 17c through which the male screw 16c passes.

Specifically, the coupling mechanism 15 in this case consists of the male screw 16c of the attachment member 11a, the through-hole 17c formed in the attachment member 11b, and two coupling nuts (nut members) 18 engaged with the male screw 16c. Also, in the state in which the male screw 16c is made to pass through the through-hole 17c, the two coupling nuts 18 are respectively fastened from two sides of the through-hole 17c in the axial direction thereof.

Accordingly, the two coupling nuts 18 sandwich peripheral edge portions on the two sides of the through-hole 17c in the axial direction thereof, and the attachment members 11a and 11b are connected to each other. In addition, by adjusting the positions at which the two coupling nuts 18 are fastened to the male screw 16c, it is possible to change the length of the male screw 16c inserted into the through-hole 17c. Accordingly, as with the above-described case, it is possible to couple the passive links 50a and 50b with each other while the distance between the two links is adjusted.

As above, the embodiments of the present disclosure have been described in detail; however, the present disclosure is not limited to the individual embodiments, described above. With the embodiments, various additions, replacements, alterations, partial elimination, etc. can be implemented within a range that does not depart from the scope of the invention or a range that does not depart from the concept and the scope of the present invention derived from the contents set forth in the claims and equivalents thereof. For example, in the above-described embodiments, the order of the individual operations or the order of the individual processing procedures is mere examples and are not limited thereto.

The invention claimed is:

1. A coupling structure comprising:

a pair of attachment members that are supported on two links that each have a longitudinal axis and move parallel to each other with a gap therebetween so as to be able to rotate about rotation axes that are perpendicular to a plane that includes the longitudinal axes of both of the links; and a coupling mechanism that fixes a distance between the pair of attachment members in an adjustable manner;

wherein the coupling mechanism comprises two male screws fixed to respective attachment members and a nut member having two female screws that respectively engage with the two male screws, the two male screws are disposed on a same axis and are in a reverse thread relationship;

wherein two fixing nuts are respectively fastened to the male screws, wherein, when the distance between the attachment members is adjusted by the respective male screws and the respective female screws, the two fixing nuts are fastened so as to be in firm contact with the nut member; and wherein each of the fixing nuts comprises an outer circumferential wall that surrounds, on an opposite side of the nut member, the male screw fastened to the fixing nut.

2. The coupling structure according to claim 1, wherein:

each of the pair of attachment members comprises two flat plates extending substantially parallel to each other, and a corresponding link of the two link is supported by the two flat plates so as to sandwich the corresponding link.

3. The coupling structure according to claim 2, wherein each of the two flat plates is provided with a hook at a tip thereof.

4. The coupling structure according to claim 2, wherein each of the two flat plates is provided with a bearing.

5. A parallel link robot comprising:

a foundation;

a movable portion that is disposed separated from the foundation by a gap;

a plurality of arms that are connected to the foundation in a pivotable manner;

two links that form a pair, the two links couple the arm and the movable portion, and the two links have longitudinal axes that are parallel to each other; and a coupling structure according to claim 1 that is provided between the pair of the two links.

\* \* \* \* \*